(12) United States Patent
Lee et al.

(10) Patent No.: US 8,323,840 B2
(45) Date of Patent: Dec. 4, 2012

(54) HYDROGEN RECIRCULATION APPARATUS FOR FUEL CELL VEHICLE

(75) Inventors: Hyun Joon Lee, Gyeonggi-do (KR); Yong Gyu Noh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1389 days.

(21) Appl. No.: 11/985,876

(22) Filed: Nov. 16, 2007

(65) Prior Publication Data

US 2008/0318093 A1 Dec. 25, 2008

(30) Foreign Application Priority Data

Jun. 25, 2007 (KR) .................. 10-2007-0062052

(51) Int. Cl.
*H01M 8/06* (2006.01)
*H01M 8/04* (2006.01)

(52) U.S. Cl. ......... 429/415; 429/414; 429/408; 429/435

(58) Field of Classification Search .................. 429/414, 429/415, 408, 435
See application file for complete search history.

(56) References Cited

U.S. PATENT DOCUMENTS

| 4,253,428 A | * | 3/1981 | Billings et al. ............... 123/1 A |
| 6,045,933 A | | 4/2000 | Okamoto et al. |
| 6,309,770 B1 | * | 10/2001 | Nagayasu et al. ............ 429/415 |
| 2002/0098395 A1 | * | 7/2002 | Shimanuki et al. ............ 429/13 |

FOREIGN PATENT DOCUMENTS

| JP | 62285366 A | * | 12/1987 |
| JP | 2004-134220 | | 4/2004 |
| KR | 10-2004-0087394 | | 10/2004 |
| WO | WO-01/97311 | | 12/2001 |

* cited by examiner

*Primary Examiner* — Barbara Gilliam
*Assistant Examiner* — Edu E Enin-Okut
(74) *Attorney, Agent, or Firm* — Edwards Wildman Palmer LLP; Peter F. Corless

(57) ABSTRACT

Disclosed is a hydrogen recirculation apparatus for a fuel cell vehicle. More specifically, the apparatus described herein includes a humidifier/heat exchanger humidifies and heat-exchanges dry hydrogen flowing through a low-pressure regulator and recirculated hydrogen flowing through a hydrogen recirculation blower. The humidifier/heat exchanger utilizes the condensed water flowing from a water separator as a source of humidity. The water heat-exchanged with hydrogen by the humidifier/heat exchanger is reused for cooling the hydrogen recirculation blower, and the water used in the hydrogen recirculation blower. The temperature increased by the operation of the hydrogen recirculation blower, is mixed with water flowing from the water separator before introduction into humidifier/heat exchanger.

3 Claims, 3 Drawing Sheets

HYDROGEN RECIRCULATION APPARATUS FOR FUEL CELL VEHICLE

CROSS-REFERENCE TO RELATED APPLICATION

This application claims the benefit under 35 U.S.C. §119 (a) on Korean Patent Application No. 10-2007-00062052 filed on Jun. 25, 2007, the entire contents of which are incorporated herein by reference.

BACKGROUND (a) Technical Field

The present invention relates to a hydrogen recirculation apparatus for a fuel cell vehicle and a method thereof. More particularly, the present invention relates to a hydrogen recirculation apparatus for a fuel cell vehicle and a method thereof which can improve the performance of a fuel cell stack by controlling the overall temperature of a hydrogen supply apparatus using a water separator and a humidifier/heat exchanger.

(b) Background Art

In general, a fuel cell is defined as an electrochemical cell that directly converts chemical energy of a fuel (hydrogen) into electrical energy. Unlike a conventional battery, the fuel cell can continuously produce electricity as long as the fuel and air are supplied thereto.

Hydrogen used as the fuel of the fuel cell includes pure hydrogen and reformed hydrogen produced by a reforming process using a hydrocarbon such as methane or ethanol. Although the pure oxygen improves efficiency of the fuel cell, there may be a problem that additional cost and undesirable increase of weight are entailed for providing a tank for the pure oxygen.

For these reasons, even though fuel efficiency is slightly reduced, normal air, which contains sufficient oxygen, is often used in the fuel cell instead of the pure oxygen.

Recently, as the fuel cell has been applied to an electric vehicle, extensive research and development have been carried out. Such a fuel cell vehicle has the same characteristics as an electric vehicle and there is no fundamental difference in driving methods; however, since the fuel cell vehicle uses pure hydrogen or reformed hydrogen as fuel to produce electricity, the fuel cell vehicle is advantageous in terms of being environmental-friendly.

In order to produce an electrochemical reaction in a fuel cell stack applied to the vehicle, it is necessary to maintain hydrogen or air at a proper humidity.

When the humidity of hydrogen is maintained properly, i.e., about 70% of relative humidity, a so-called 'dryout' phenomenon in a membrane electrode assembly (MEA) can be avoided.

The dryout phenomenon mainly occurs when the humidity of an electrode is lowered, at which the transfer of ions and electrons is not practically feasible, thus resulting in a performance degradation of the fuel cell.

In order to prevent the dryout phenomenon in the fuel cell stack, the humidity of hydrogen should be maintained at an appropriate level by a humidifier while being supplied to the fuel cell stack as a fuel.

As shown in FIG. 1, hydrogen at a proper humidity passing through a humidifier is directed to an inlet of a fuel cell stack 100 to react chemically in an active area and discharged through a hydrogen outlet of the fuel cell stack 100, which is thereafter recirculated by a hydrogen circulation system.

The reason for the recirculation of hydrogen is to prevent a flooding phenomenon occurred in the fuel cell stack 100. The flooding phenomenon occurs when the moisture contained in the hydrogen in a liquid phase blocks the flow of hydrogen. Another reason for the recirculation is to prevent output reduction and damage of the MEA that can be caused by insufficiency of the amount of hydrogen in the vicinity of the hydrogen outlet as the hydrogen is significantly consumed when a sudden high power is required.

A conventional hydrogen supply passage mounted on an intake manifold has some problems in that the flooding phenomenon is likely to occur even though the hydrogen is recirculated, and thus the hydrogen is often insufficient in the vicinity of the hydrogen outlet when the load is suddenly increased.

A system for recirculating unreacted hydrogen to an inlet of a fuel cell stack to increase hydrogen utilization of a fuel cell system is referred to as a hydrogen recirculation system. In the hydrogen recirculation system, a hydrogen recirculation blower 11 or an ejector may be employed and the hydrogen recirculation blower 11 is typically used due to easy control.

However, if water is condensed in a hydrogen recirculation line or inside the hydrogen recirculation blower, the condensed water causes severe damage (e.g., load increase) to the hydrogen recirculation blower operating at a high speed for a long time, thus causing frequent breakdowns.

That is, if the hydrogen recirculation blower breaks down due to overload as the condensed water flows in the blower, it results in a decrease in the amount of humidity and hydrogen, which in turn causes a performance degradation of the fuel cell stack.

Accordingly, a water separator is provided in the hydrogen recirculation line to remove the condensed water, thus preventing the break down of the hydrogen recirculation blower. In case that the trapped water in the water separator is dropped on a road, it may cause an icy road in winter.

Furthermore, water is generated due to a temperature difference when the recirculated hydrogen is mixed with newly supplied hydrogen. If the water is generated in the hydrogen recirculation line, the amount of pressure reduction is increased and, if the water is generated inside the fuel cell stack, it causes the performance degradation of the stack due to excessive water supply.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above problems. In one aspect, the present provides a hydrogen recirculation apparatus for a fuel cell vehicle and a method thereof, in which newly supplied dry hydrogen is humidified by a humidifier/heat exchanger using water flowing from a water separator such that the humidifier/heat exchanger performs the humidifying operation even when a hydrogen recirculation blower breaks down. Moreover, since newly supplied hydrogen and recirculated hydrogen are humidified and heat-exchanged by the humidifier/heat exchanger, it is possible to prevent the generation of condensed water due to a temperature difference between the newly supplied hydrogen and the recirculated hydrogen and prevent the condensed water from flowing into the hydrogen recirculation blower and a fuel cell stack, thus preventing malfunction of the hydrogen recirculation blower and improving the performance of the fuel cell stack.

In a preferred embodiment, the present invention provides a hydrogen recirculation apparatus for a fuel cell vehicle, which comprises a fuel tank for storing hydrogen, a pressure regulator disposed downstream for regulating pressure of hydrogen, a solenoid valve for opening/closing a passage from the fuel tank to the pressure regulator, a fuel cell stack having an inlet and an outlet, a hydrogen recirculation line for recirculating residual hydrogen discharged from the outlet of the fuel cell, and a hydrogen recirculation blower. The pressure regulator may be composed of a high-pressure regulator and a low-pressure regulator.

The apparatus further comprises a water separator that is provided in the hydrogen recirculation line connecting the hydrogen recirculation blower and the outlet of the fuel cell stack; and a humidifier/heat exchanger for humidifying and heat-exchanging dry hydrogen flowing through the low-pressure regulator and recirculated hydrogen flowing through the hydrogen recirculation blower.

The water heat-exchanged with hydrogen by the humidifier/heat exchanger is reused for cooling the hydrogen recirculation blower. Subsequently, the water used in the hydrogen recirculation blower, the temperature of which is increased by the operation of the hydrogen recirculation blower, is mixed with water flowing from the water separator before introduction into the humidifier/heat exchanger.

In a further preferred embodiment, the humidifier/heat exchanger is a planar membrane humidifier or a hollow-fiber membrane humidifier.

In another aspect, the present invention provides a hydrogen recirculation method for a fuel cell vehicle, in which a solenoid valve for starting and stopping is opened so that hydrogen stored in a fuel tank is regulated to a predetermined pressure by a high-pressure regulator and a low-pressure regulator and supplied to an inlet of a fuel cell stack, and residual hydrogen in an outlet of the fuel cell stack is recirculated to the inlet of the fuel cell stack through a hydrogen recirculation line and a hydrogen recirculation blower, the method comprising: separating condensed water generated in the outlet of the fuel cell stack from the hydrogen recirculation line by a water separator provided between the hydrogen recirculation blower and the outlet of the fuel cell stack; and receiving dry hydrogen flowing through the low-pressure regulator and recirculated hydrogen flowing through the hydrogen recirculation blower and humidifying the dry hydrogen and the residual hydrogen using water flowing from a humidifier/heat exchanger.

Preferably, the hydrogen recirculation method for a fuel cell vehicle further comprises: cooling the hydrogen recirculation blower by using the water flowing from a humidifier/heat exchanger, which is cooled after being heat-exchanged with hydrogen in the humidifier/heat exchanger; and recirculating the water used in the hydrogen recirculation blower, of which the temperature is increased as the temperature of the hydrogen recirculation blower is increased, to be mixed with water flowing from the water separator before the introduction into the humidifier/heat exchanger.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

Figure 1:
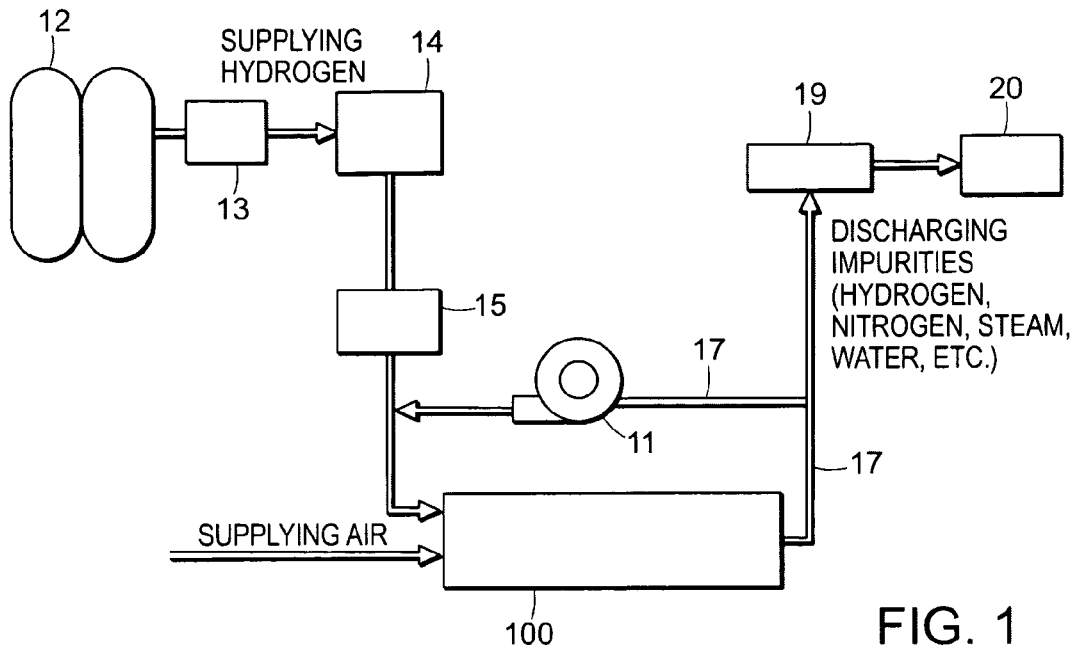
FIG. 1 is a diagram illustrating the configuration of a conventional hydrogen supply system.

Reference numerals set forth in the Drawings includes reference to the following elements as further discussed below:

| | |
|---|---|
| 10: fuel cell stack | 11: hydrogen recirculation blower |
| 12: fuel tank | 13: high-pressure regulator |
| 14: solenoid valve for starting and stopping | |
| 15: lower-pressure regulator | 16: humidifier/heat exchanger |
| 17: hydrogen recirculation line | 18: water separator |
| 19: solenoid valve for purging | 20: hydrogen discharge apparatus |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 2:
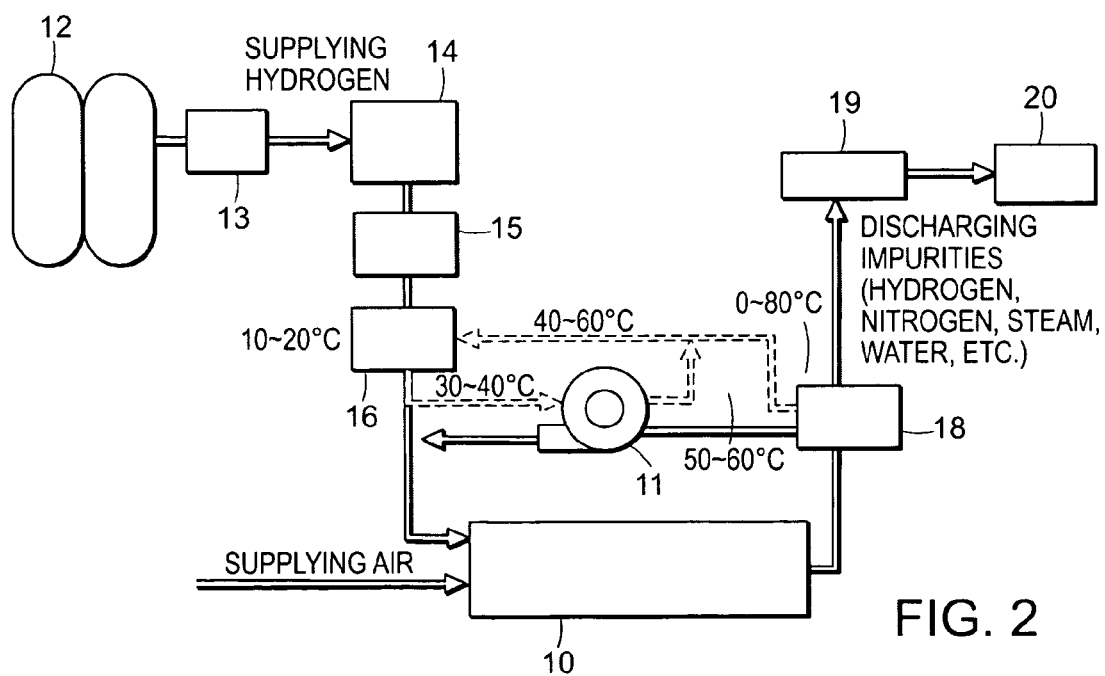
FIG. 2 is a diagram illustrating the configuration of a hydrogen recirculation apparatus in accordance with an exemplary embodiment of the present invention.

FIG. 2 is a diagram illustrating the configuration of a hydrogen recirculation apparatus in accordance with an exemplary embodiment of the present invention.

The present invention aims at preventing malfunction of a hydrogen recirculation blower and improving the performance of a fuel cell stack by controlling the overall temperature of a hydrogen recirculation apparatus using a water separator and a humidifier/heat exchanger.

In the hydrogen recirculation apparatus, hydrogen stored at high pressure in a fuel tank 12 is regulated to a predetermined pressure by a high-pressure regulator 13 and discharged through a solenoid valve 14 for starting and stopping a vehicle. Moreover, the pressure of hydrogen is reduced to a predetermined pressure by a low-pressure regulator 15 and the hydrogen under reduced pressure is supplied to the humidifier/heat exchanger 16 so as to be humidified and heat-exchanged.

Dry hydrogen discharged through the solenoid valve 14 for starting and stopping is humidified by passing through the humidifier/heat exchanger 16 to maintain a proper humidity and the humidified hydrogen is supplied to an inlet of the fuel cell stack 10.

Newly supplied hydrogen flowing in the fuel cell stack 10 is used in an electrochemical reaction and then flows in a hydrogen recirculation line 17 so that residual hydrogen is resupplied to the inlet of the stack 10.

A water separator 18 is provided in the hydrogen recirculation line 17 between the fuel cell stack 10 and the hydrogen recirculation blower 11 so as to prevent the hydrogen recirculation blower 11 from being damaged by water condensed in the hydrogen recirculation line 17 or inside the hydrogen recirculation blower 11.

The condensed water in the hydrogen recirculation line 17 and in the stack 10 is collected in the water separator 18, and the temperature of the water collected in the water separator 18 is kept at about 0° C. to 80° C., although it is different according to load of the stack 10. At this time, the temperature can be increased as the output of the stack is increased; however, it is somewhat difficult to increase the temperature when starting at a low temperature.

The water flowing from the water separator 18 has a temperature similar to that of the inlet of the stack 10, i.e., at about 40° C. to 60° C., and is supplied to the humidifier/heat exchanger 16. The water supplied to the humidifier/heat exchanger 16 is utilized as a source for humidifying and heat-exchanging the newly supplied dry hydrogen.

The temperature of the water heat-exchanged with hydrogen by the humidifier/heat exchanger 16 is reduced to about 10° C. to 20° C. and the water is resupplied to the hydrogen recirculation blower 11 to be used for cooling the hydrogen recirculation blower 11. Since the temperature of the hydrogen recirculation blower 11 is readily increased even at a low temperature when the hydrogen recirculation blower 11 is driven at high RPM, it is possible to rapidly increase the temperature when starting at a low temperature. The temperature of the water flowing from the hydrogen recirculation blower 11 is increased to about 50° C. to 60° C. The water flowing from the hydrogen recirculation blower 11 is reused as a source for humidification/heat-exchange of the humidifier/heat exchanger 16 together with the water flowing from the water separator 18 at the same temperature.

As discussed above, it is possible to control the temperature of the hydrogen recirculation blower 11 by utilizing the water from the water separator 18 for various purposes. Moreover, it is possible to prevent malfunction of the hydrogen recirculation blower 11 by preventing the condensed water from flowing into the hydrogen recirculation line 17 and the hydrogen recirculation blower 11 by means of the water separator 18.

Since high RPM operation is possible through stable operation of the hydrogen recirculation blower 11, it is possible to increase the amount of hydrogen recirculation. Moreover, with the humidifying process for the dry hydrogen by the humidifier/heat exchanger 16 and the stable operation of the hydrogen recirculation blower 11, it is possible to prevent the flooding phenomenon, thus improving the performance and durability of the fuel cell stack 10.

Especially, with the humidifier/heat exchanger 16 which adjusts the temperatures of the supplied hydrogen and the recirculated hydrogen to be similar to each other, it is possible to prevent the water condensation and improve the performance of the fuel cell stack 10 by an increase in the amount of humidification. Moreover, with the water separator 18 which plays a buffering role during hydrogen purge, it is possible to prevent a sudden reduction in pressure.

Figure 3:
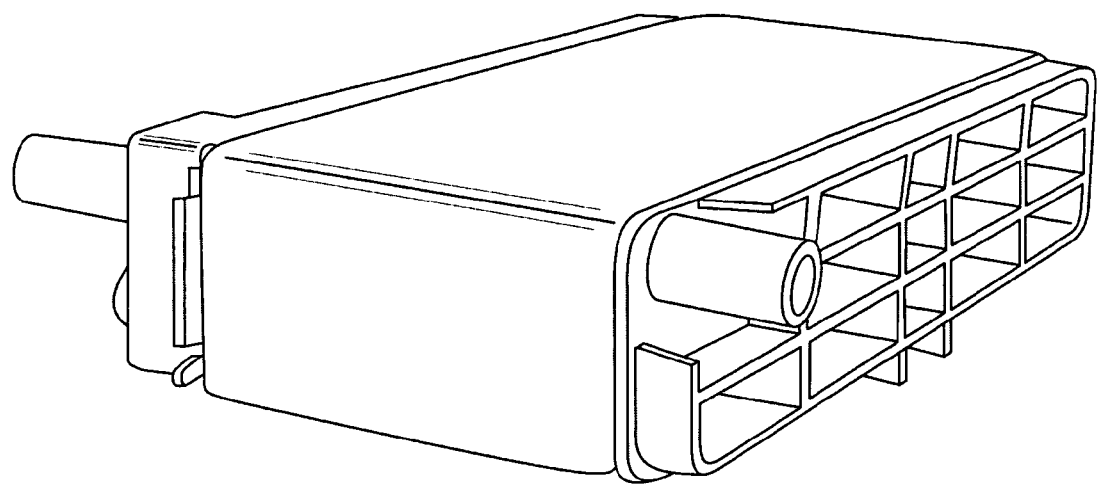
FIG. 3 shows a planar membrane humidifier applied to a humidifier/heat exchanger of FIG. 2.
Figure 4:
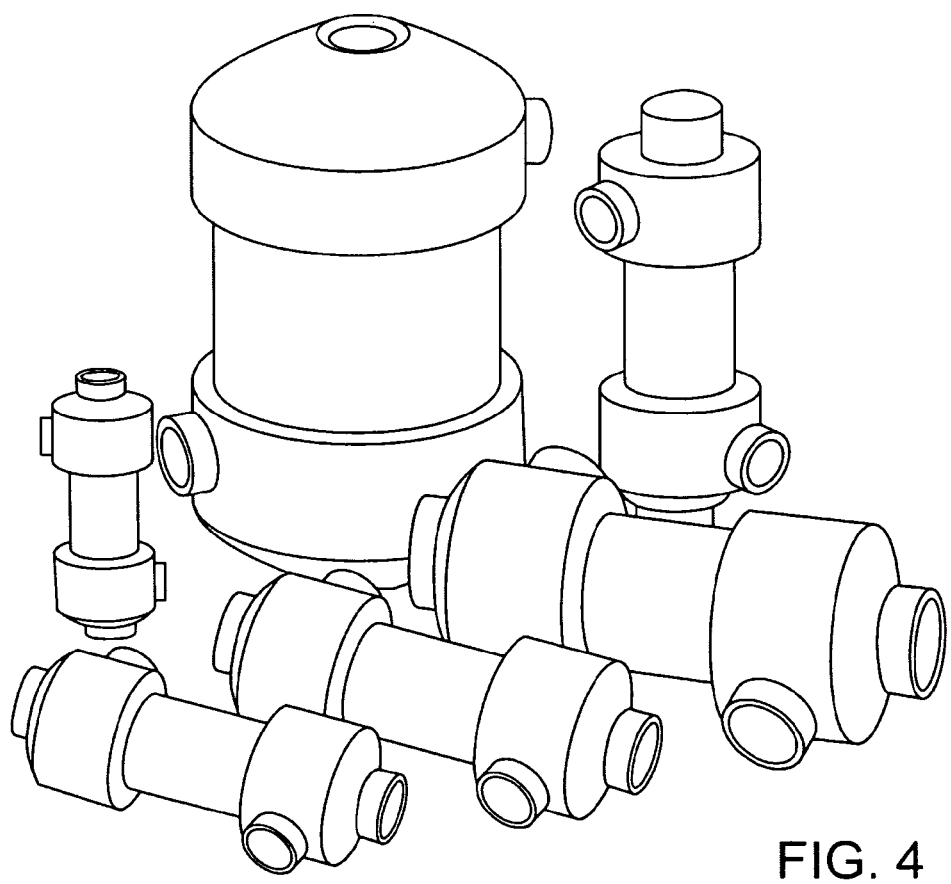
FIG. 4 shows a hollow-fiber membrane humidifier applied to the humidifier/heat exchanger of FIG. 2.
Figure 5:
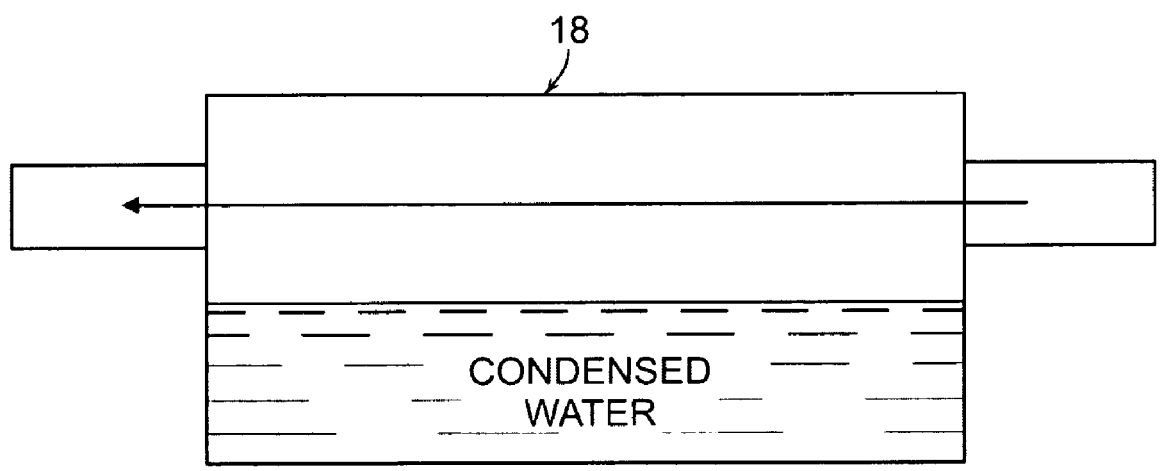
FIG. 5 is a schematic diagram illustrating a water separator of FIG. 2

FIG. 3 shows a planar membrane humidifier that can be applied to a humidifier/heat exchanger of FIG. 2, FIG. 4 shows a hollow-fiber membrane humidifier that can be applied to the humidifier/heat exchanger of FIG. 2, and FIG. 5 is a schematic diagram illustrating the water separator of FIG. 2.

As shown in FIGS. 3 and 4, a membrane humidifier is applied to the humidifier/heat exchanger 16, and the membrane humidifier is broadly classified into a planar membrane humidifier shown in FIG. 3 and a hollow-fiber membrane humidifier shown in FIG. 4, in which the humidification is achieved by the temperature and humidity of hot water. Any humidifying method known in the art can be used, and it is not limited to a particular method.

As shown in FIG. 5, the water separator 18 separates and removes condensed water generated in the hydrogen recirculation line 17. It should be designed so as to prevent pressure reduction and, remove condensed water, smoothly, and so as not to affect hydrogen supply by slopping water. Any water separating method known in the art can be used, and it is not limited to a particular method.

As described above, according to the hydrogen recirculation apparatus for a fuel cell vehicle and the method thereof, it is possible to prevent the condensed water from flowing into the hydrogen recirculation blower and the fuel cell stack using the water separator so as to increase the hydrogen utilization and the amount of humidification, thus improving the performance and durability of the fuel cell stack.

Moreover, since the water flowing from the water separator is used for the humidification of the humidifier/heat exchanger and for cooling the hydrogen recirculation blower, it is possible to control the overall temperature of the hydrogen recirculation apparatus, improve the durability of the hydrogen recirculation blower, and improve the startability at low temperature by raising the temperature of coolant in advance according to the temperature rise of the hydrogen recirculation blower, even though the temperature of the fuel cell stack is not increased.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hydrogen recirculation apparatus for a fuel cell vehicle comprising:
    a fuel tank storing hydrogen;
    a high-pressure regulator and a low-pressure regulator for regulating pressure of hydrogen;
    a solenoid valve configured to open and close a passage from the fuel tank to the high pressure regulator and the low pressure regulators;
    a fuel cell stack having an inlet and an outlet;
    a hydrogen recirculation blower;
    a hydrogen recirculation line connecting the outlet of the fuel cell stack and the hydrogen recirculation blower for recirculating residual hydrogen discharged from the outlet of the fuel cell;
    a water separator provided in the hydrogen recirculation line between the hydrogen recirculation blower and the outlet of the fuel cell stack, the water separator separating condensed water generated in the hydrogen recirculation line;
    a first water line directly connected to an outlet of the water separator that intersects with a second water line directly connected to a water outlet of the hydrogen recirculation blower, wherein the first and second water lines are both connected to a third water line which directly connects both the water separator and the hydrogen recirculation blower to an inlet of a humidifier/heat exchanger; and
    the humidifier/heat exchanger humidifying and heat-exchanging dry hydrogen flowing through the low-pressure regulator and recirculated hydrogen flowing through the hydrogen recirculation blower, the humidifier/heat exchanger utilizing the condensed water flowing from the water separator as a source of humidity wherein the low pressure regulator is disposed in a supply line between the solenoid and the humidifier/heat exchanger to supply hydrogen from the fuel tank at a specific pressure to the humidifier/heat exchanger,
wherein the water heat-exchanged with hydrogen by the humidifier/heat exchanger is reused for cooling the hydrogen recirculation blower, and the water used in the hydrogen recirculation blower, the temperature of which is increased by the operation of the hydrogen recirculation blower, is mixed with water flowing from the water separator.

2. The apparatus of claim 1, wherein the humidifier/heat exchanger is a planar membrane humidifier or a hollow-fiber membrane humidifier.

3. A hydrogen recirculation apparatus for a fuel cell vehicle comprising:
  a fuel cell stack having an inlet and an outlet;
  a hydrogen recirculation line connecting an outlet of a fuel cell stack and a hydrogen recirculation blower to recirculate residual hydrogen discharged from the outlet of the fuel cell stack;
  a water separator disposed in the hydrogen recirculation line between the hydrogen recirculation blower and the outlet of the fuel cell stack, the water separator separating condensed water generated in the hydrogen recirculation line;
  a first water line directly connected to an outlet of the water separator that intersects with a second water line directly connected to a water outlet of the hydrogen recirculation blower, wherein the first and second water lines are both connected to a third water line which directly connects both the water separator and the hydrogen recirculation blower to an inlet of a humidifier/heat exchanger; and
  the humidifier/heat exchanger humidifying and heat-exchanging dry hydrogen flowing through the low-pressure regulator and recirculated hydrogen flowing through the hydrogen recirculation blower, the humidifier/heat exchanger utilizing the condensed water flowing from the water separator as a source of humidity wherein the low pressure regulator is disposed in a supply line between a solenoid and the humidifier/heat exchanger to supply hydrogen from a fuel tank at a specific pressure to the humidifier/heat exchanger.

* * * * *